C. J. WOOD.
Steam Radiator.

Patented Mar. 21, 1871.

Witnesses:
Alva Hubbard
George W. Cox

Inventor:
Chas. J. Wood

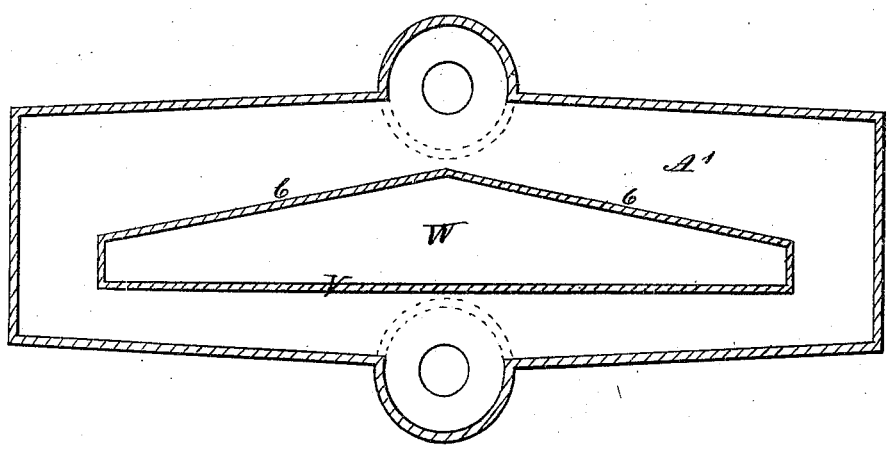

CHARLES J. WOOD, OF BALTIMORE, MARYLAND.

Letters Patent No. 112,881, dated March 21, 1871.

IMPROVEMENT IN STEAM-HEATERS.

The Schedule referred to in these Letters Patent and making part of the same.

I, CHARLES J. WOOD, of Baltimore, in the county of Baltimore and State of Maryland, have invented certain Improvements in Steam-heated Radiators, of which the following is a specification.

Nature and Object of the Invention.

My improvements relates to the well-known steam-heated apparatus for warming air, consisting of a series of approximated shallow chambers, each provided with regularly-curved projections on its outer sides and a central steam-supplying and water-draining opening, communicating directly with both sides of a horizontal partition in the middle of each end of said chamber and with each other; and The first part of my invention consists of a double-inclined partition within each of the radiating shallow chambers, in combination with a distinct entrance-opening, for the steam, near the middle of the upper edge of the said chamber, and a distinct or separate outlet-opening, for steam and water of condensation, near the middle of the lower edge of the same chamber: the object of this part of my invention being two-fold—first, to produce a continuous current of the steam from the entrance-opening along toward each end of the said shallow chamber, and thence along, in an opposite direction, to the outlet-opening near the middle of the lower edge of the said chamber; and second, to facilitate the discharge of the water of condensation on the partition, and thus producing more effectiveness in heating the radiating-chambers.

The second part of my invention consists in constructing the upper edge of each of the shallow chambers to slope downward from the steam-inlet opening near the middle to the respective ends thereof, and also the lower edge of each to slope downward from its outer ends to the outlet for the steam and water of condensation; the object of this part of my invention being to facilitate the passing out of the water of condensation on the said edges.

Description of the Accompanying Drawing.

Figure 4 is a modification of the said shallow chambers.

General Description.

The shallow chambers each consists of two corresponding plates, A and A', of cast-iron, secured together by a surrounding flange or edge-plate, a", cast on the inner side of one of them so as to form a steam-tight shallow case, the steam for heating them being introduced through a double-flanged hole, 3, cast near the middle of the upper edge of the case, and discharged with the usual water of condensation through a like double-flanged hole, 4, cast near the middle of the lower edge of the case in such a manner that the upper and the lower flanged holes, 3 and 4, of any number of the said shallow chambers can be adjusted side by side together (see fig. 3) so as to form steam-tight passage ways (when duly cemented) into, out of, and through each chamber, from and to any suitable steam-generator; the series of said chambers being firmly secured together by a bolt (not shown) passing through flanged central holes 5 in each.

For the double purpose of producing the continuous current of the steam through each end of the chamber and the rapid removal of any water, a double-inclined partition, C, extends from its apex, which is directly and immediately below the upper opening 3, in downward, inclined directions toward and near to the extreme lower corners of the interior of each end of the said chamber, (see fig. 2;) the said partition fitting steam-tight at its edges against the two opposite side-plates A and A', but leaving an open space, 8, at its extreme lower ends, through which the steam and the water of condensation from the partition pass toward the outlet-opening 4; and, to facilitate the passage of the water of condensation from the upper and the lower parts of the surrounding edge-plate a", the chambers A and A' are made with the upper and the lower edges of each of the two respective ends sloping or tapering from the inlet and outlet-holes, 3 and 4, toward their outer ends, (see figs. 1 and 2.)

Figure 1:
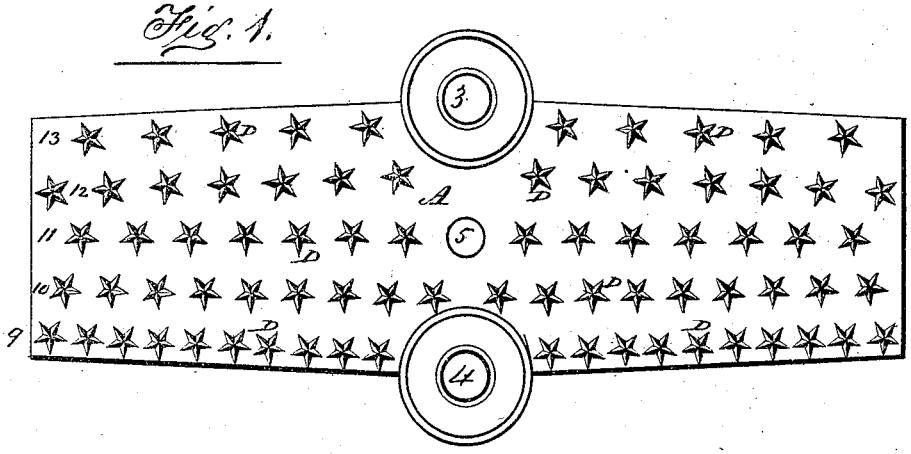
Figure 1 is a side elevation of one of the shallow chambers embodying my invention.
Figure 2:
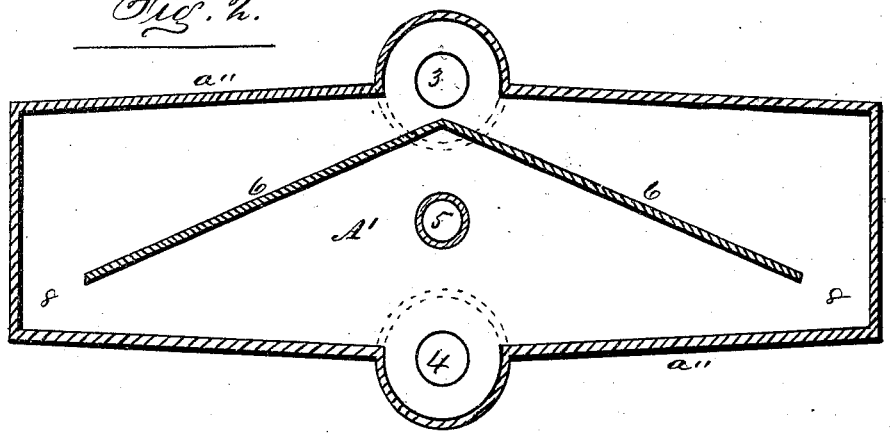
Figure 2 is a central vertical longitudinal section of fig. 1.

The outer side surfaces of both of the side-plates A and A' have a series of longitudinal rows, 9, 10, 11, 12, 13, of short, pointed, projections D D, each in the rayed form of a star, in its transverse section; those of the bottom row, 9, having their bases nearly in contact, and the succeeding rows, 10, 11, 12, 13, more or less, diminishing successively in the number of the said projections so that the upper one, 13, may have only about half, more or less, the number of those in the bottom row 9, (see fig. 1.)

Figure 3:
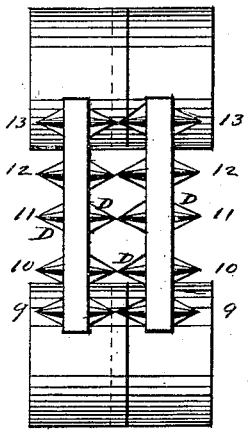
Figure 3 is an end view of two of the said shallow chambers adjusted together side by side.

The said projections, D D, may be cast on the plates A and A', so that their apexes may meet together, as in fig. 3, or so as to intervene with each other.

The object of the described construction and arrangement of the said projections is to equalize the air-heating functions of the different rows, as the upper portion of each chamber will be more strongly heated by the entering steam than the lower portion through which it escapes, and to more rapidly and effectually break up the currents of air rising from below the bottom row 9 through the successive rows above; and this will result whether the chambers be arranged to communicate side by side or by their top and bottom edges as direct radiators.

As a modification in the construction of the said radiating shallow chambers, where their intended place of location is such as to render it desirable to increase their radiating surface without increasing either the length or width of the plates A A', either with or without the projections D, I, intend to connect the two lower ends of the double-inclined partition C by means of a close, horizontal partition, V, (see diagram, fig. 4,) and make an opening, W, through each of the plates A A', which will be limited or bounded by the outside of said partitions, and thus cause the latter to serve as additional outside radiating surfaces.

In thus modifying, it will be seen that the previously-described circulation of steam through the radiating-chamber, and of the water-draining position of the double-inclined partition C, of the lower plate $a''$ thereof, remaining precisely as before, and without any change in their functions, the only modification being the connecting of the lower ends of the planes C C by means of the horizontal partition-plate V, and making the opening W between them, thus increasing the surface of radiation of the chamber.

Claims.

1. The double-inclined partition C, in combination with the distinct inlet-opening 3 and the distinct outlet-opening 4, substantially as and for the purposes hereinbefore set forth.

2. The sloping or tapering upper and lower edges of the said shallow chamber, substantially as and for the purpose hereinbefore set forth and described.

3. The horizontal partition V and the open space W, in combination with the double-inclined partition C and plates A A', substantially as and for the purpose hereinbefore set forth.

CHAS. J. WOOD.

Witnesses:
 ALVA HUBBARD,
 GEORGE W. COX.